US005741020A

United States Patent [19]

Harroun

[11] Patent Number: 5,741,020

[45] Date of Patent: Apr. 21, 1998

[54] COLLAPSABLE COMBINATION CHAIR WALKER

[75] Inventor: Mary M. Harroun, 1357 Northmoor Ct., Northbrook, Ill. 60062

[73] Assignee: Mary M. Harroun, Hebron, Ill.

[21] Appl. No.: 299,051

[22] Filed: Aug. 31, 1994

[51] Int. Cl.$^6$ .......... B62B 7/06

[52] U.S. Cl. .......... 280/42; 280/648; 280/650; 280/87.05; 297/5

[58] Field of Search .......... 280/87.021, 87.05, 280/649, 650, 639, 42, 647, 648; 297/DIG. 4, 5; 135/67; 272/70.3

[56] References Cited

U.S. PATENT DOCUMENTS

| | | | |
|---|---|---|---|
| 3,695,702 | 10/1972 | Ingellis | 297/441 |
| 4,165,127 | 8/1979 | Vago | 280/87.021 |
| 4,342,465 | 8/1982 | Stillings | 280/87.02 W |
| 4,621,804 | 11/1986 | Mueller | 272/70.3 |
| 4,759,526 | 7/1988 | Vinyard | 280/289 WC |
| 4,770,410 | 9/1988 | Brown | 272/70.3 |
| 4,953,851 | 9/1990 | Sherlock | 272/70.3 |
| 5,058,912 | 10/1991 | Harroun | 280/87.021 |
| 5,083,806 | 1/1992 | Brown | 280/87.05 |
| 5,154,438 | 10/1992 | Barclay | 280/649 |
| 5,277,438 | 1/1994 | Chuang | 280/87.05 |
| 5,380,262 | 1/1995 | Austin | 280/87.05 |

*Primary Examiner*—Anne Marie Boehler
*Assistant Examiner*—Michael Mar

[57] ABSTRACT

A new and improved collapsable, combination chair/walker for aiding elderly and/or disabled people in independent movement includes an upstanding foldable, or collapsable frame including a front rail, a pair of opposite side rails and a back, and the frame supports a removable seat at an intermediate level for a person to sit within the frame. An open space is provided forwardly of the seat for accomodating the legs of an occupant in both a standing/walking position and/or a seated position. The open space is defined between the front rail and a forward edge of the seat and a flexible detachable safety strap extends into the open space between the seat and front rail for preventing an occupant from sliding out of the seat onto the floor or falling to the floor from a walking or standing position. Rollers or casters are provided for easy movement of the chair/walker and brakes are provided on at least some of the rollers to immobilize the chair/walker when desired. The front rail is movable between a closed and locked position for normal operation of the chair/walker and an open position for permitting a person easy ingress to the interior of the frame and easy egress from the chair/walker when desired. When the seat is detached from the frame and the back and front rail are opened, opposite sides of the frame structure are then permitted to be moved toward one another for collapsing the chair/walker for storage and/or shipment. When the frame is folded up or collapsed, as described, the chair/walker is small and compact in size ready for transport in an automobile and is ready for shipment or storage.

18 Claims, 2 Drawing Sheets

COLLAPSABLE COMBINATION CHAIR WALKER

BACKGROUND OF THE INVENTION

1. Field of the Invention

The present invention relates to a new and improved, collapsable combination chair/walker for providing elderly and/or disabled persons with a safe supportive system for both walking, standing and sitting, while also providing for ease in storage and transport when in a folded up or collapsed condition. The collapsable combination chair/walker permits an elderly and/or disabled person to walk about independently without significant bodily restraint and provides the safety of a surrounding and supportive enclosing framework to prevent falling and/or sliding or slipping out of the seat.

2. Description of the Prior Art

Wheelchairs have been used by elderly and/or disabled persons both for sitting and for moving about. Often times wheelchairs require another person to move the occupant about, and wheelchairs do not generally permit an occupant to walk or stand in an erect position. Moreover, many wheelchairs do not afford ample safety systems to prevent an occupant from sliding or slipping out of the seat onto the floor or to prevent an occupant from falling forwardly out of the chair. While some wheelchairs may be folded up or collapsed into a more compact condition for convenience of storage and transport, until the present invention, collapsable combination chair/walker devices have not been available that are readily foldable or collapsable.

Devices such as multiple legged canes or walkers are available but the devices require a user to lift or slide the base of the device along a floor or other surface. Many walkers are open on the back side or rear, permiting the device to move ahead at too fast a pace permiting a user to fall backwards out of the walker in a rearward direction. Many walkers are difficult for a patient to get into or out of and generally offer no seat or sitting board so that a user can conveniently rest.

Combination chair/walkers, as disclosed in U.S. Pat. No. 5,058,912, have been developed that allow an occupant or user the freedom to walk or stand when desired, with availability of a seat for sitting when tired, but these devices are often large and bulky and are difficult and/or costly to transport, ship or store.

Objects of the Invention

It is an object of the present invention to provide a new and improved, collapsable combination chair/walker which may be folded-up or collapsed to a smaller compact size when not in use.

It is an object of the present invention to provide a new and improved, collapsable combination chair/walker for use by elderly and/or disabled persons which provides a safe system for both walking, standing and sitting with minimal restraints.

Yet another object of the present invention is to provide a new and improved, collapsable combination chair/walker which affords relatively easy ingress and egress to a user and which provides a surrounding and enclosing safety frame for minimizing the chances of a user falling or sliding or slipping off of the seat.

Still another object of the present invention is to provide a new and improved, collapsable combination chair/walker of the character described having a pivotal frontal cross-bar that is movable between a closed and locked safe position for use in guiding the movement of the chair/walker, and open an position for affording easy ingress and egress to a user.

Yet another object of the present invention is to provide a new and improved, collapsable combination chair/walker having a detachable safety strap extendable between the seat and a frontal cross-bar with little or no obstruction to a user during standing or walking in an erect position yet provides a safety device for a user seated in the chair/walker for preventing the user from sliding or slipping off the seat onto the floor.

Still another object of the present invention is to provide a new and improved, collapsable combination chair/walker having a brake system that is easily operated for securing the chair/walker against unwanted movement.

A still further object of the present invention is to provide a new and improved, collapsable combination chair/walker that is easy to use, that affords a user ready walking mobility when desired, that provides comfortable seating for a user and that affords a user the opportunity to walk or stand in an erect position with a surrounding safety frame to prevent falling.

Another object of the present invention is to provide a new and improved, foldable or collapsable combination chair/walker of the character described that is neat in appearance, easy to clean and maintain and relatively economical to manufacture and repair.

Another object of the present invention is to provide a new and improved, collapsable combination chair/walker having a frontal cross-bar that is easily opened and closed and has a button actuated locking and release mechanism mounted adjacent on the end of the cross bar allowing easy ingress and egress.

It is another object and advantage of the present invention to provide a new and improved, collapsable combination chair/walker having a detachable seat that is easily removed and replaced into position for sitting. More particularly, it is an important object and advantage of the present invention to provide a new and improved, collapsable combination chair/walker that is easily folded up into a compact form by a user or others after detaching the seat, opening the back and opening the frontal cross-bar.

BRIEF SUMMARY OF THE INVENTION

The foregoing and other objects and advantages of the present invention are accomplished in a preferred embodiment disclosed herein comprising a new and improved, collapsable combination chair/walker of the character described, especially designed for aiding the mobility of disabled and/or elderly persons and capable of being folded up or collapsed into a smaller, more compact size when not in use for more economical transport and storage. The collapsable combination chair/walker includes a tubular steel framework having a pair of side frames with front legs and rear legs for supporting a removable or detachable seat at a convenient sitting level. The seat is detachably mounted on intermediate level side rails and is secured in place with clips. The seat supporting side rails are supported to move up and down on the legs between a lower position when the seat is in place and an upper position when the seat is removed and the frame is folded up or collapsed. A sloping cross-bar is connected between each seat support rail and a lower leg rail on an opposite side of the frame. The lower leg rails are pivotally attached at opposite ends to a front leg and a back leg of the frame. Each cross-bar is pivotal about the longitudinal axis of a lower leg rail between a lower sloping position when the seat is used and a steeper upper position when sides of the frame are folded up or collapsed. Rollers or casters are provided on each leg for easy movement of the collapsable combination chair/walker over a floor or other surface, and at least one pair of casters is provided with a brake for activation by a user to retain the chair/walker in a stationary position when desired.

The seat extends forwardly of the rear legs and has a forward edge spaced rearwardly of the front legs providing a relatively large open space at the front half for a user's legs while standing, walking or sitting in the seat. Each side frame includes upper arm supporting side rail extending between front and rear legs forming a portion of arm enclosing safety framework for surrounding an occupant while in an erect walking or standing position and while seated. The safety framework includes a back extending upwardly of the seat at the rear of the frame and the back is pivotally secured to one rear leg and detachably connected to a rear leg on the opposite side when the framework is in an expanded open position for use. The collapsable combination chair/walker includes a frontal cross-bar movable between a closed and locked position extending between the front legs of the side frames and an open position pivotally extended outwardly from one of said front legs for affording a person easy ingress and egress to and from the interior of the safety frame and permitting the side frames to collapse toward one another when not in use. When the frontal cross-bar is closed and locked, support is provided for the occupant's hands and arms and the cross-bar is used to propel the collapsable combination chair/walker in a forward or rearward direction when the occupant is standing in the open area ahead of the seat during use as a walker. Also, the frontal cross-bar positively secures together the front end portions at the desired position.

An added safety feature comprises a detachable safety strap of flexible material extending forwardly of the seat between a user's legs and detachably secured to the front cross-bar to prevent a user from sliding or slipping off the seat onto the floor or falling down onto the floor from an erect standing position.

BRIEF DESCRIPTION OF THE DRAWINGS

For a better understanding of the present invention, reference should be had to the following detailed description taken in conjunction with the drawing, in which.

DETAILED DESCRIPTION OF A PREFERRED EMBODIMENT OF THE INVENTION

Referring now more particularly to the drawings, therein is illustrated a new and improved, collapsable combination chair/walker constructed in accordance with the features of the present invention and referred to generally by the reference numberal 10. The collapsable chair/walker 10 is especially designed and useful in affording an elderly and/or disabled person 12 independent mobility when used as a walker (FIG. 1) with the occupant in an upright position standing or walking or as a chair while the occupant is in a sitting position (FIG. 2).

Figure 2:
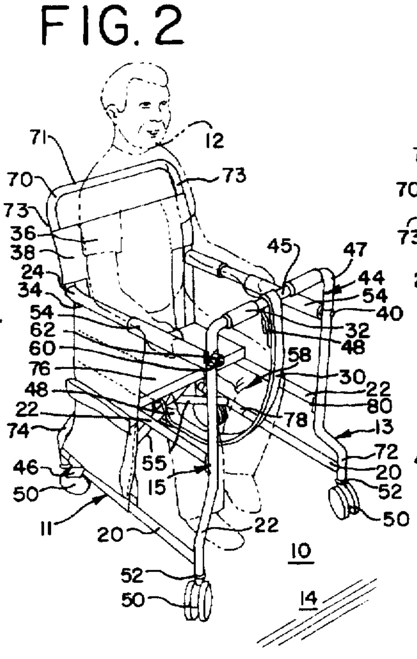
FIG. 2 is a perspective front elevational view of the chair/walker shown in use with an occupant in a sitting position.

When an occupant 12 is seated in the chair/walker 10 as shown in FIG. 2, the collapsable combination chair/walker may be moved about over a supporting floor or other surface 14 by use of the occupants' feet and legs or by an attendant, and the collapsable combination chair/walker may be maintained in a stationary or fixed position when desired by means of brakes 5 provided on supporting rollers or casters 50 activated by foot pedals 46 as described hereinafter.

The collapsable combination chair/walker 10 includes a tubular steel framework 11 employing a pair of opposite left and right hand side frames 13 and 15. Each side frame includes an upstanding front leg 72 and a spaced apart, upstanding rear leg 74. Each leg 72 and 74 includes a lower portion splayed outwardly for increased stability and has a caster gripping ring 52 mounted at a lower end holding a caster 50 supporting the collapsable combination chair/walker 10 for easy rolling movement over the surface 14 when a user or occupant desires to move.

A side pouch assembly 34 is provided on the right hand side frame 11 for containing an occupants personal items. At least one pair of casters 50 (preferrably the rearward caster assemblies) have foot operated brakes thereon provided with toe or foot operated brake levers 46 for locking the caster wheels or rollers against rotation when a user 12 desires to retain the chair/walker 10 in a particular location against movement. The brake levers 46 are depressed downwardly to lock the rollers of the rear casters 50 against rotation and the brakes are releasable by upward movement of the brake levers 46.

The casters 50 are preferably of a swivel type to provide for easy steerability of the collapsable combination chair/walker 10.

Figure 1:
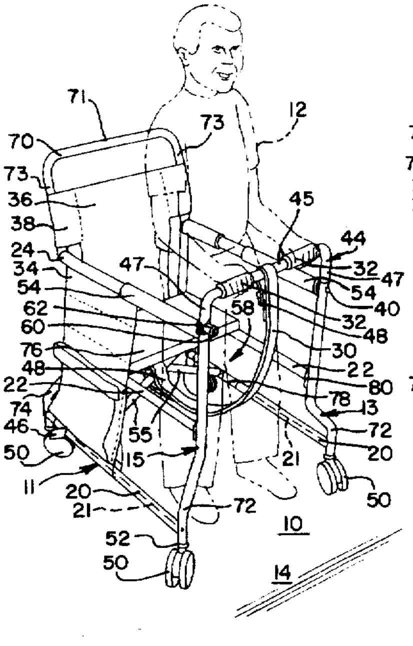
FIG. 1 is a perspective front elevational view of a new and improved, combination chair/walker constructed in accordance with the features of the present invention shown as in use as a walker with an occupant in an erect, standing or walking position.
Figure 3:
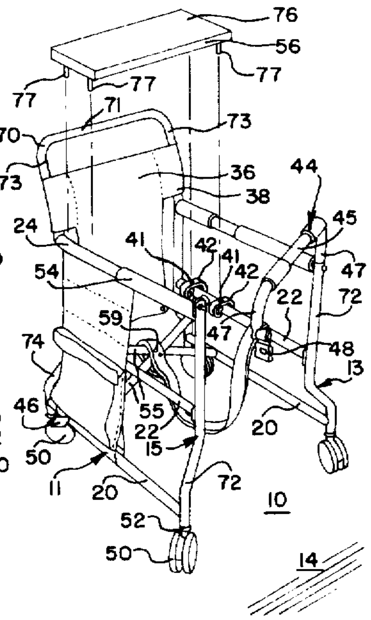
FIG. 3 is a perspective front elevational view of the chair/walker while not in use after a seat has been removed and with a front cross arm in an open position for ingress and egress.
Figure 5:
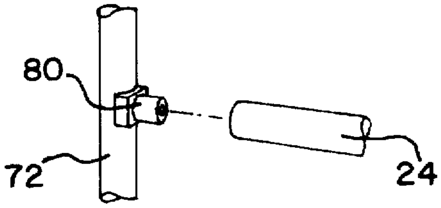
FIG. 5 is a fragmentary side elevational view showing use of chair rail guide as a sliding means and attachment thereof to the side seat rail.

In accordance with the invention, a front leg 72 and a rear leg 74 of each side frame 13 and 15 are interconnected at a lower level by a rod or pivot axle (hidden from view) on and shown in FIG. 1 by the dotted lines 21. On each pivot axle 21 is mounted a lower foot rail 20 for pivotal movement about a longitudinal axis. Forward and rearward ends of the supporting pivot axles are interconnected to the respective legs preferably by means of welds. Each side frame 13 and 15 also includes an upper level supporting arm rail 24 connected at opposite ends to a front leg 72 and a rear leg 74. At a mid-level, each side frame 11 and 13 includes a seat supporting side rail 22 slidably engaging the front and rear legs 72 and 74 by means of chair rail guide inserts 80 (FIG. 5) having a concave curved face in sliding abutment against the legs for allowing the mid-level seat supporting side rails to move up and down between a lower operating position (FIGS. 1, 2 and 3) and an upper or higher position (FIG. 7) when the opposite side frames 13 and 15 are moved toward each other to fold up the chair/walker 10 into a compact position for storage or transport. In order to help maintain the opposite side frames 13 and 15 in parallel relationship when in an operative widely spaced apart position for use as shown in FIGS. 1–3, and yet permit the framework 11 of the collapsable combination chair/walker 10 to be folded up or collapsed into a more compact size for easier storage and shipment when not in use, the combination chair/walker includes a pair of generally transversely extending cross-arms 55 positioned below the seat 76 just to the rear of the front edge 56. Each cross-arm 55 extends from a lower side rail 20 of one side frame 13 or 15 to a seat support side rail 22 on an opposite side frame. The cross arms 55 cross one another at the center of the collapsable chair/walker 10 and are connected together by a semi-permanent but removable pin 59 (FIG. 3). With the pin removed, the side frames 13 and 15 may be completely disconnected from one another if required.

Figure 7:
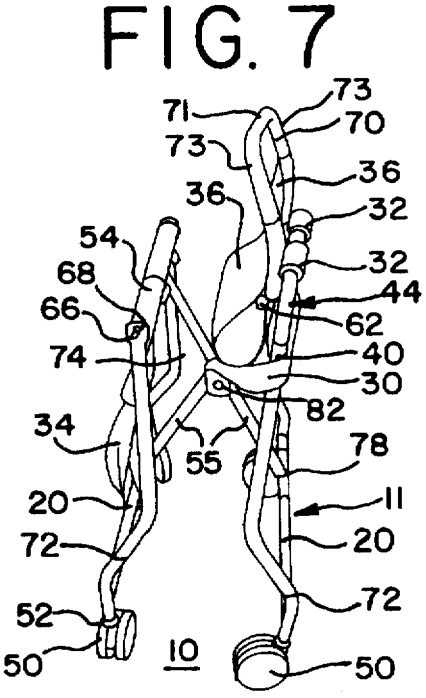
FIG. 7 is a perspective side elevational view of the chair/walker in a folded up or collapsed condition for transport, shipment or storage.

Opposite ends of each cross-bar 55 are connected by welding or the like to the respective lower foot rails 20 and seat support rails 22. When the side frames 13 and 15 are moved toward and away from one another, the angular relationship between the cross-arms 55 changes in a scissors-like action and the lower foot rails 22 rotate on their pivot axles 21 about their longitudinal axes. Similarly, the seat support rails 22 also rotate about their longitudinal axes as their opposite ends are guided in an upward and downward movement by guide elements 80 engaging the front and rear legs 72 and 74. When the collapsable combination chair/walker 10 is in a folded-up or collapsed condition in a non-operative position as shown in FIG. 7, the seat support rails 22 are in an uppermost position near the level of the upper arm rails 24. When the side frames 13 and 15 are moved about to an extended operative position (FIGS. 1–3), the seat support rails 22 are moved downwardly to a convenient sitting level and the seat 76 is then secured in place (FIGS. 1 and 2) with the pins 77 extending into the openings or sockets 41 on the seat support clips 42 (FIG. 3) on the seat support rails 22.

The cross arms 55 serve to limit the maximum distance between the opposite side frames 13 and 15 in the expanded operative position and when the seat 76 is mounted in place on the seat supports side rails 22, another limiting member is provided for strengthing the framework 11 and maintining the parallelism between the side frames 13 and 15 and the maximum distance therebetween.

The mid-level side rails 22 provide support for a removable seat 76 formed of strong, light weight material such as wood, particle board, etc. and provided on the upper face with a resiliant foam covered by a flexible mesh and coated with a rubberized, washable plastic material. The seat 76 is attachable at opposite end portions to the mid-level side rails 22 by means of spring clips 42 having detent openings for receiving pins 72 extending from the underside of the seat (FIG. 3). The spring clips 42 are attached to the seat support rails 22 by means of fasteners (not shown). When the seat 76 is attached in place as shown in FIGS. 1 and 2, a forward edge 56 is spaced well rearward of the front legs 72 to provide an open space 58 in a forward position of the framework 11 to accomodate the legs of the user or occupant 12 when standing or walking (FIG. 1) and when seated (FIG. 2). The frame work 11 of the collapsable combination chair/walker 10 is free of transverse cross-members extending between the front legs 72 and this area is open and in communication with the open space 58 forward of the seat 76 to afford easy walking for the user 12 without obstruction to forward stepping movements of the legs and feet as shown in FIG. 1.

In order to provide support for the back of an occupant 12 either in a standing or walking erect position (FIG. 1) or when seated (FIG. 2), the framework includes a detachable or pivotable back support 36 formed with a tubular, U-shaped metal frame member 70 having an upper height bight 71 and a pair of downwardly defining legs 73. A web of flexible plastic webbing or sheet material is formed with a pair of sleeves 38 along opposite side edges mounted on the legs 73.

The upper, transversely extending height 71 of the back support 70 is positioned rearwardly of the rear legs 74 (FIGS. 1, 2 and 3) because the legs 73 are bent at rearward slope angle extending upwardly of the rear legs at a level above the side arm rails 24. Side edge pockets 38 of the seat back web 36 are slipped onto the legs 73 and are extended over upper end portions of the rear legs 74 of the framework 11 and a lower edge of the back web is connected with a rearward edge portion of the horizontal seat 76.

Figure 4:
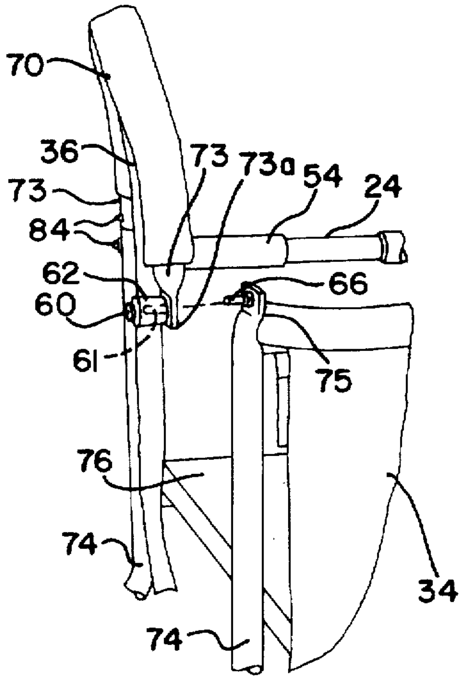
FIG. 4 is a fragmentary elevational view of a rear portion of the chair/walker showing a back support member in an open, unlocked condition prior to folding up or collapsing.
Figure 6:
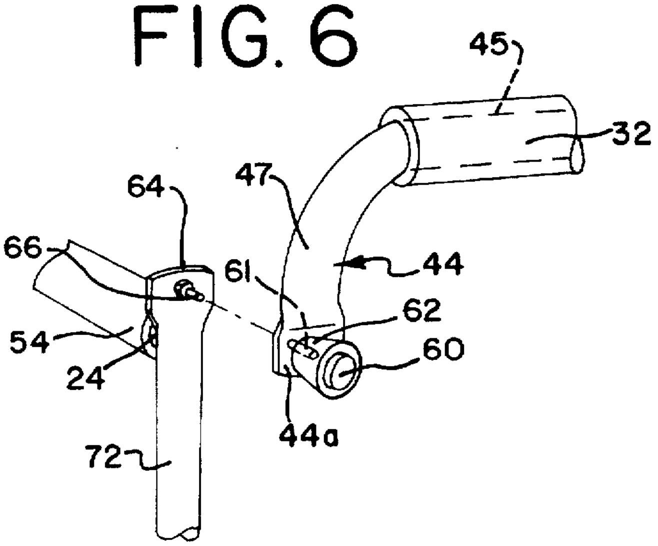
FIG. 6 is a fragmentary front elevational view of a frontal cross arm of the chair/walker in an unlatched open position.

In order to provide frontal support and safety for an occupant 12 while using the collapsable combination chair/walker 10 either while guiding movement thereof or while standing or walking or while seated, an upper frontal cross-bar assembly 44 is provided to extend between and be detachably interconnected to upper end portions of the front legs 72. The frontal cross-bar assembly 44 includes a U-shaped member having a horizontal upper height portion 45 with a pair of downturned legs 47 at opposite ends and is designed to move between a closed and locked position (FIGS. 1–4) extending transversely between the front legs 72 and an open position (dotted lines FIG. 5) pivoted outwardly from a left hand leg to afford a person easy ingress and egress to the interior of the support frame of the collapsable combination chair/walker 10. Moreover, when the frontal cross-bar 44 is open, the side frames 13 and 15 may be moved toward one another, and when closed a strengthing member is established at the forward portion of the framework 11. The left hand leg 47 is supported for pivotal movement about a vertical axis on the left front leg 72. On the right side, the leg 47 of the frontal cross-bar assembly 44 has a flattened-out portion **44*a* at the lower end (FIG. 6) for supporting a push button operated locking and latching mechanism 62 having a push button 60 on an outer face depressable inwardly toward the rear of the framework 11 for release of a pin 66 mounted on a flattened out upper end portion 64 of the right hand front leg 72. The latch and lock mechanism 62 may be of a type manufactured by Southco, Inc., and sold under the description of Push Button Latch, part number 34-10-201-30. These type of latches 62 provide a pin 68 and a socket 61 interconnection which holds firmly when the push button 60 is not being pressed inwardly. A similar latching and locking assembly 62 (FIG. 4) is provided for the back support 70 including a rearwardly extending pin 66 mounted on a flattened-out upper end portion 75 on the right hand rear leg 74. The left hand leg 73 of the member 70 is pivotally mounted on the upper end of the left hand rear leg 74 as at 84 so that the entire back support can be pivoted away from an interconnected operative back supporting portion transverse to the side frame 13 and 15, and an open position (FIG. 4) permitting the side frames to be collapsed toward one another. The right side back support 73 has a flattened out lower end portion 73*a* on which the latch 62 is mounted with the socket 61 facing the pin 66**.

The collapsable combination chair/walker 10 includes a detachable safety strap 30 formed of strong light weight webbing, and extending forwardly from under the seat 76 into the open space 58. In use, the safety strap 30 extends between a user's legs and is detachably connectable to the frontal cross-bar assembly 44. At the forward end, the safety strap 30 is detachably connected by means of a latch element 48 and the strap is looped around the mid portion of the cross-bar assembly 44 by means of a latch element. Similarly, at the rearward end, the safety strap 30 is also looped around the central portion of the cross-arm 55 under the seat and a latch element 48 is provided for disconnecting the safety strap when desired.

Arms, rails and other portions of the framework 11 are covered with resiliant tubular foam member grips 54 and 32 as shown in FIG. 1 to provide an occupant 12 with firm yet cushioning surfaces for hand placement when walking, standing and sitting.

In view of the foregoing, it will thus be seen that in accordance with the present invention, the new and improved, collapsable combination chair/walker 10, affords an elderly and/or disabled person 12 independent mobility in an erect standing and walking position (FIG. 1) as well as in a sitting position (FIG. 2). The frontal cross-bar assembly 44 opens to provide easy ingress and egress to the interior of the surrounding and supporting framework 11 which includes arm rails 24 and the back 36. When closed and locked, the frontal cross-bar assembly 44 offers no impediment to walking as the space below is entirely open to accomodate the legs and feet. In addition, the closed cross-bar assembly 44 offers support for the hands and arms of a user 12 and provides for steering and guidance of the collapsable combination chair/walker 10 along a floor or other surface 14. The detachable, flexible safety strap 30 provides additional support and safety to prevent falling out of the seat 76. When folded up in a collapsed position (FIG. 7), the collapsable combination chair/walker 10 is compact and small in size and can be shipped fully assembled from a factory to point of use, ready for operation when unfolded to the operative position.

Although the present invention has been depicted and described in terms of a single preferred embodiment, in the appended claims it is intended to include all those equivalent structures, some of which may be apparent upon reading this description and others that may be obvious after study and review.

What is claimed and sought to be secured by Letters Patent of the United States is:

1. A collapsible combination chair/walker; comprising a pair of parallel spaced apart side frames, each side frame including a front leg, a rear leg, an upper arm rail, an intermediate level seat support rail and a lower foot rail;

a pair of cross bars intermediate said front and rear legs for permanently interconnecting said frames, each cross bar connected between a foot rail on a side frame and a seat rail on an opposite side frame;

pivot means for supporting opposite ends of at least one of said foot and seat rails for pivotal movement about a longitudinal axis thereof when said side frames are moved toward and away from one another between an expanded operative position and a folded up collapsed position;

slide means for supporting opposite ends of at least one of said seat and foot rails between said front and rear legs for vertical sliding movement between lower and upper positions when said side frames are moved between said operative position and said collapsed position;

seat means having a forward edge between said cross bars and said front legs detachably mounted on said seat rails for retaining said side frames in said operative position, providing a seating surface below said arm rails and an open space forwardly thereof for accommodating the legs of a person standing, walking or sitting;

frontal cross-bar means extending transversely between said side frames adjacent said front legs in a closed position for providing safety and a guide rail for moving said combination chair/walker and movable to an open position for providing ingress and egress to interior space between said side frames from the front and for permitting movement of said side frames toward said collapsed position from said operative position; and back support means pivotally secured at one end to one of said side frames and detachably secured at an opposite end to an opposite one of said side frames by first releasable locking means, said back support means extending transversely between said side frames adjacent said rear legs in a closed position for providing safety and back support for a user and for maintaining said side frames in said operative position and movable to an open position extending between said side frames for permitting movement of said side frames toward said collapsed position from said operative position.

2. The collapsable combination chair/walker of claim 1, wherein;

said pivot means supports at least one of said foot rails at opposite ends for pivotal movement about a longitudinal axis thereof.

3. The collapsable combination chair/walker, of claim 2, wherein;

said pivot means supports said foot rails at opposite ends thereof for pivot movement about a longitudinal axis thereof.

4. The collapsable combination chair/walker of claim 1, wherein;

said slide means supports opposite ends of at least one of said seat support rails for movement up and down said front and rear legs of a side frame.

5. The collapsable combination chair/walker of claim 1, wherein;

opposite ends of said seat means are reattachably connected to said seat support rails.

6. The collapsable combination chair/walker of claim 5, including;

pin and socket connectors for detachably connecting said seat means to said seat support rails.

7. The collapsable combination chair/walker of claim 1, including;

flexible safety strap means detachably interconnected between said cross bars and said frontal cross bar means.

8. The collapsable combination chair/walker of claim 7, wherein;

a rear end portion of said safety strap means is looped around both said cross bars between said side frames and a forward end portion of said safety strap means includes detachable connector means for connecting and disconnecting said safety strap means and said frontal cross bar.

9. The collapsable combination chair/walker of claim 1, including;

removable pin means for interconnecting said cross arms together when said side frames are moved apart into said expanded operative position.

10. The collapsable combination chair/walker of claim 1, wherein;

said frontal cross bar means is pivotally secured to a side frame and is detachably secured to an opposite side frame by second releasable lock means.

11. The collapsable combination chair/walker of claim 10, wherein;

said second releasable lock means includes a pin and socket connector.

12. The collapsible combination chair/walker of claim 11, wherein said pin and socket connector includes a pin mounted on one of said frontal cross-bar means and side frames and a socket mounted on the other of said frontal cross-bar means and side frame.

13. The collapsable combination chair/walker of claim 12, wherein;

said socket connector is mounted on said frontal cross-bar means and said pin is mounted on a front leg of said side frame.

14. The collapsable combination chair/walker of claim 11, wherein;

said pin and socket connector includes a depressable push-button for releasing said pin from said socket so that said frontal cross-bar means can move from said closed transverse position to an open position.

15. The collapsable combination chair/walker of claim 1, wherein;

said first releasable lock means includes a pin and socket connector.

16. The collapsible combination chair/walker of claim 15, wherein said pin and socket connector includes a pin mounted on one of said frontal cross-bar means and opposite side frame and a socket mounted on the other of said frontal cross-bar means and opposite side frame.

17. The collapsable combination chair/walker of claim 16, wherein;

said socket is mounted on said back support means and said pin is mounted on said rear leg of the opposite side frame.

18. The collapsable combination chair/walker of claim 17, wherein;

said pin and socket connector includes a depressable push-button for releasing said pin from said socket so that said back support means can move from said closed transverse position to an open position.

* * * * *